I. DREYFUS.
Apparatus for Ejecting Water.
No. 166,080. Patented July 27, 1875.
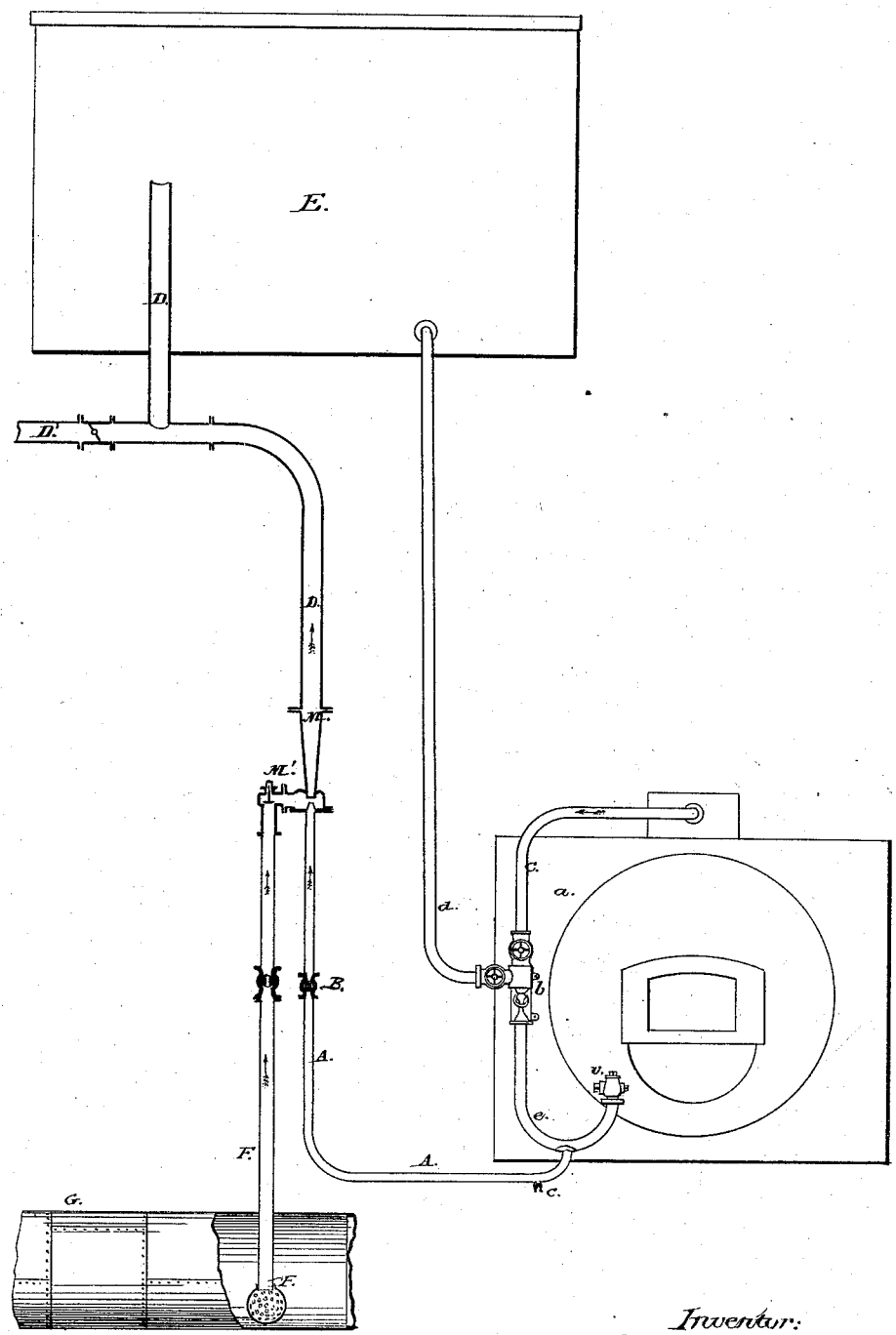

UNITED STATES PATENT OFFICE.

ISIDORE DREYFUS, OF NEW YORK, N. Y., ASSIGNOR TO NATHAN & DREYFUS, OF SAME PLACE.

IMPROVEMENT IN APPARATUS FOR EJECTING WATER.

Specification forming part of Letters Patent No. 166,080, dated July 27, 1875; application filed July 1, 1875.

*To all whom it may concern:*

Be it known that I, ISIDORE DREYFUS, of the city, county, and State of New York, have invented certain new and useful Improvements in Apparatus for Ejecting Fluids and for other purposes, of which the following is a specification:

Boiler feeders and injectors of any stated capacity, besides doing their duty in supplying the boiler with the necessary quantity of water to raise steam as desired, can be further utilized and made beneficial for various purposes. We will suppose, for example, an injector or other boiler-feeder in operation, and able to deliver more water than is needed. Now, to use this surplus water with the heat and velocity it has acquired in its passage through such injector or boiler-feeder, if I, by throttling or closing the delivery-pipe, or in any other suitable way, divert from said pipe all or a part of said water, with the heat and velocity acquired, as stated, into another pipe leading from the delivery-pipe to a reservoir-tank or other vessel, I obtain an ascending column of a considerable velocity which is capable of being made use of as a propelling and forcing power; and if I add to the diverting-pipe another pipe extending downward into a well or lower reservoir, where water or other liquid may be found or stored, I obtain an ejecting action which will raise said water or liquid and impart to it the velocity of the propelling column of water. In fact, there is thus produced an ejecting apparatus which is especially useful when it is desirable to limit the boiler-supply without stopping the motive power of, or interfering with, the ordinary supply apparatus—for instance, where I use hydrant water and have a well also on the premises, I am enabled by this process to alternate the water supply, or to raise the well-water for the tank-reservoir, or other useful storage or supply purposes.

I have mentioned only one of the many uses for which the power thus obtained is available. It is in connection with this use that I have illustrated my invention in the accompanying drawing, which I shall now proceed to describe.

The drawing is an elevation of an apparatus embodying my invention and adapted particularly for boiler-feeding purposes. Those parts of the apparatus in which my present invention more particularly resides are represented in section.

$a$ is a boiler; $b$, the injector or other boiler-feeder; $c$, the steam-pipe leading from the steam-dome of the boiler to the injector; $d$, the water-supply pipe leading from the water-tank E to the injector; and $e$, the delivery-pipe leading from the injector to the water-space of the boiler. These parts are constructed and arranged to operate together in the usual way and require no further description.

Leading from the delivery-pipe at a point intermediate between the injector and the boiler is a pipe, A, which, for convenience sake, I shall term the return-pipe or the diverting-pipe. This pipe has a valve or cock, B, by which the flow of the diverted stream through the pipe can be controlled and regulated. The pipe is also provided with a pet or drain cock, C. If the injector be working it is manifest that the opening of the valve or cock B will cause the impelled column of mingled water and steam in the delivery-pipe to rush into and through the diverting-pipe under the combined pressure of the injector and the boiler.

I do not here claim broadly diverting the feed-water from the delivery-pipe in the manner above described. This feature I have made the subject of separate application for Letters Patent.

To utilize the propelling or forcing power of such a column of water I proceed as follows: I connect with the diverting-pipe another pipe, F, which leads therefrom to a lower tank or reservoir, G. At the point where the two pipes meet there may be provided any suitable ejection device, as shown. The conduit or pipe F, which I shall term the supply-pipe or conduit, is provided with a check-valve, M', to prevent return through said pipe. The contents of pipes F and A mingle at the point M and thence pass up through the pipe D, which is a continuation of the diverting-pipe enlarged to accommodate the additional stream coming up from the lower reservoir through the pipe F. The pipe D may lead to the tank E, as shown, or it may be directed to deliver its contents to some other point, as indicated at D'. Whenever water is diverted from the delivery-pipe and permitted to pass through pipe A the forcibly impelled column will, it is manifest, exert an ejecting action which will draw water from the lower reservoir G through pipe F and carry this supply thus obtained to the upper tank E or to any other point of delivery.

It will thus be seen that I am enabled in this way to supply liquid, vapor, gas, or other fluids from a lower reservoir to an upper one for any circulating purpose, for storage, &c.

But, as above intimated, this apparatus can be put to many other uses. It may be used as a compressing, or a motive and propelling power—for instance, in testing boilers, tanks, or pipes from a distance, the water from the pipe A may be used as a compressor. Not only can the boiler be filled with warm or cold water, but it can be compressed to any extent that may be desired or necessary for testing the strength or pressure capacity of the same. It may also be used for any hydraulic apparatus or device instead of pump or plunger, or on hydraulic lifters, brakes, &c. Not only can there be transmitted a given pressure from another boiler, but there is gained, in operating through the injector, an over pressure, which, through the medium of the aforesaid apparatus, can be applied and utilized, even if vapors, gases, or fluids other than water are to be lifted or forced to their proper place, wherever they may be required to go. It may also be used in mines, smelting and chemical works, &c., where it becomes necessary to condense or absorb objectionable gases or vapors, which, passing through the pipe F, or its equivalent for the purpose, will be condensed as soon as they are brought in contact with the ascending column of water in the pipe A.

The above will suffice to indicate the variety of uses to which my invention may be applied.

In conclusion, I state my claim as follows:

The combination, substantially as described, with a boiler-feeding apparatus, of an ejecting or forcing apparatus, and a return or diverting pipe, which communicates with the feed-delivery pipe at a point between the boiler-feeder and the boiler, and is adapted to conduct from said feed-delivery pipe an impelled column of water that becomes, in the ejecting or forcing apparatus, the ejecting or forcing agent, substantially as set forth.

In testimony whereof, I have hereunto signed my name this 11th day of June, A. D. 1875.

ISIDORE DREYFUS.

Witnesses:
 CHARLES JUDGE,
 E. HOHLERS.